United States Patent [19]
Howe

[11] 3,978,536
[45] Sept. 7, 1976

[54] COLLAPSIBLE WATERCRAFT

[76] Inventor: Ronald D. Howe, 1330 Fourth St., Red Bluff, Calif. 96080

[22] Filed: July 25, 1975

[21] Appl. No.: 598,981

Related U.S. Application Data

[63] Continuation of Ser. No. 420,455, Nov. 30, 1973, abandoned.

[52] U.S. Cl. ......................................... 9/2 C; 9/1.2; 114/61
[51] Int. Cl.² .......................................... B63B 7/02
[58] Field of Search .................... 9/1 T, 2 C; 114/61

[56] References Cited
UNITED STATES PATENTS

| | | |
|---|---|---|
| 1,344,903 | 6/1920 | Koiransky .......................... 114/61 |
| 3,025,537 | 3/1962 | Rasmussen ............................. 9/1 T |
| 3,629,884 | 12/1971 | Brown .................................. 114/61 |
| 3,731,644 | 5/1973 | Bradt .................................... 114/61 |

*Primary Examiner*—Trygve M. Blix
*Assistant Examiner*—Gregory W. O'Connor
*Attorney, Agent, or Firm*—Paul B. Fihe

[57] ABSTRACT

A collapsible watercraft which can be readily transported along a highway when in its collapsed disposition but, upon arrival at a lake or other body of water, can be readily erected into an extended operative disposition capable of reception of a small trailer, camper or other living unit thus to provide a portable houseboat.

1 Claim, 2 Drawing Figures

INVENTOR.
RONALD D. HOWE
BY
Paul B. Fike
PATENT AGENT

COLLAPSIBLE WATERCRAFT

This is a continuation of application Ser. No. 420,455 filed on Nov. 30, 1973, now abandoned.

The present invention relates generally to watercraft and, more particularly, to a collapsible watercraft which can be readily transported when in its collapsed disposition.

BACKGROUND OF THE INVENTION

Portable living units, such as housetrailers which may be pulled behind an automobile or campers which are readily received within the cargo box of a pick-up truck, have become increasingly popular with travellers and particularly those who wish to explore more remote areas where conventional motels or other living accommodations are not available. Many of the areas visited by these travellers contain lakes or rivers so that use of a boat is desirable but hauling of boats other than those of relatively small dimensions is troublesome and actually prohibited if the boat has a substantial beam dimension.

SUMMARY OF THE INVENTION

Recognizing the desirability of a boat, it is a general objective of the present invention to provide a watercraft of simple form which can be folded into a collapsed compact disposition for ease of transportation on land but which can be readily erected into an extended disposition for use on the water and, particularly, for such use in combination with a camper unit, small trailer or the like so that, in effect, a very commodious houseboat is provided.

Generally, the objective is achieved by providing a watercraft taking generally the form of a raft-like structure having an extensive but foldable deck portion together with associated pontoon structures which provide for flotation of the erected raft. When erected, the deck is arranged to receive, for example, a camper unit which is tied to the deck structure by its normal connecting cables and when so assembled the camper unit, itself, provides the means whereby the raft is maintained in its extended operative disposition.

BRIEF DESCRIPTION OF THE DRAWING

The objective of the invention and the manner in which it is achieved will be more readily understood by a perusal of the following description of the exemplary structure shown in the accompanying drawing wherein.

DETAILED DESCRIPTION OF THE EXEMPLARY EMBODIMENT

Figure 1:
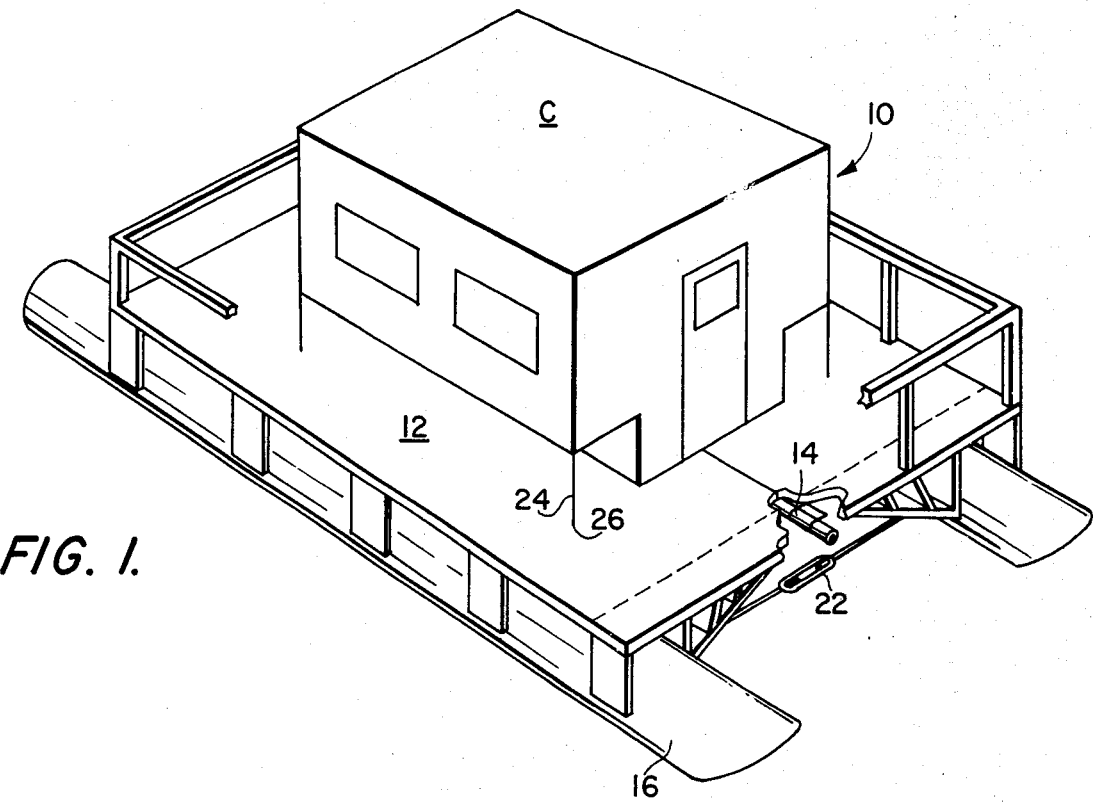
FIG. 1 is a perspective view of a collapsible watercraft embodying the present invention in its erected operative disposition.

With initial reference to FIG. 1, the collapsible watercraft embodying the invention includes a raft 10 having an extensive deck structure 12 which in its extended disposition may have a width of 12 feet and a length of 16 feet so as to be capable of receiving a living unit, such as the camper C illustrated, substantially centrally thereof while leaving a considerable walkway therearound adjacent the edges of the deck.

Figure 2:
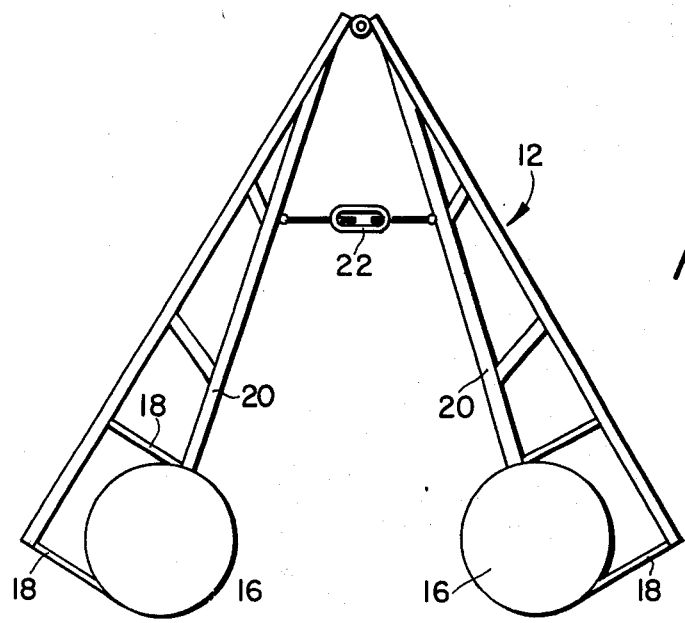
FIG. 2 is an end view of the raft portion of the watercraft in its collapsed storage disposition.

Along its longitudinal center line, the deck 12 is divided and the two divided sections are pivotally joined at longitudinally-spaced intervals by five hinges 14 permitting the entire deck structure to be folded from the flat, extended disposition, as shown in FIG. 1, to the angularly-related, collapsed disposition, illustrated in FIG. 2.

Flotation members 16, preferably in the form of elongated pontoons, are secured by suitable dependent brackets 18 to the under side of each of the deck sections adjacent their outer-most edges, each pontoon preferably extending the full length of the deck section supported thereabove. In addition to the described brackets 18, the pontoons 16 are joined to the under surface of the deck sections 12 by simple triangular truss structures 20 at longitudinal intervals so that the weight of the entire deck is appropriately supported from the pontoons. The size of the pontoons 16, of course, will vary with the weight to be carried, but it has been found in practice that an ordinary camper C, as illustrated, can be supported on a deck having the twelve by sixteen feet dimensions with pontoons whose diameter is approximately two feet.

The triangular trusses 20 which support the deck sections 12 are interconnected at intervals by retractable members 22 which may take the form of a cable and a turnbuckle that can be retracted or shortened into the position shown in FIG. 2 wherein the foldable deck sections 12 are pulled into their collapsed adjacent dispositions. Such foldable disposition is permitted because of the triangular configuration of the trusses 20 and when the described collapsed configuration has been achieved, the overall width of the structure is not more than six feet so that it can be transported on any highway without restriction because of excessive width.

When the structure is erected to the operative disposition, shown in FIG. 1, the turnbuckle 22 is loosened to an extent such that the deck sections can be raised to their co-planar flat dispositions, as illustrated, and the cable and turnbuckle preclude any further pivotal motion of the deck sections upwardly.

The camper C, itself, serves to maintain the deck sections 12 in their co-planar relationship to supplement the action of the described cable and turnbuckle 22. As shown, the camper C is placed over the central hinged area of the deck 12 and its weight therefore maintains the two deck sections against swinging further upwardly, thus to supplement directly the turnbuckle restriction on such pivotal motion. In turn, the turnbuckle and cables 24, normally used to connect the exterior of the camper C to the sides of the supporting pick-up truck, are connected to suitable eyelets 26 on the upper surface of the deck 12 so as to hold the camper firmly on the deck and at the same time hold the deck sections against pivoting in a downward direction or, in other words, towards the collapsed disposition, shown in FIG. 2. Thus, in summary, the camper C is rigidly tied to the deck structure 12 and when so fastened maintains the entire raft 10 rigidly in its operative disposition, as shown in FIG. 1. Sockets can be formed around the edges of the deck sections 12 for the reception of side rails 28 which, in turn, can be withdrawn when the unit is to be disassembled for storage or transportation purposes.

Obviously, many other additions and/or modifications can also be made in the structure without departing from the spirit of the invention and accordingly the foregoing description of one embodiment is to be considered as purely exemplary and not in a limiting sense, and the actual scope of the invention is to be indicated only by reference to the appended claims.

What is claimed is:

1. A collapsible watercraft which comprises
a raft having two hingedly connected sections foldable between an operative extended substantially flat horizontal disposition and a downwardly folded collapsed disposition,
a rigid living unit having a substantially flat bottom arranged to rest on said foldable raft over its hinged connection in its extended disposition, and
holding means including cables connected between the outer sides of said living unit and said raft sections to hold said raft rigidly in its extended disposition and said living unit rigidly connected to said raft, said cables and said rigid living unit constituting the sole means for holding said raft rigidly in its extended disposition.

* * * * *